Patented Nov. 4, 1952

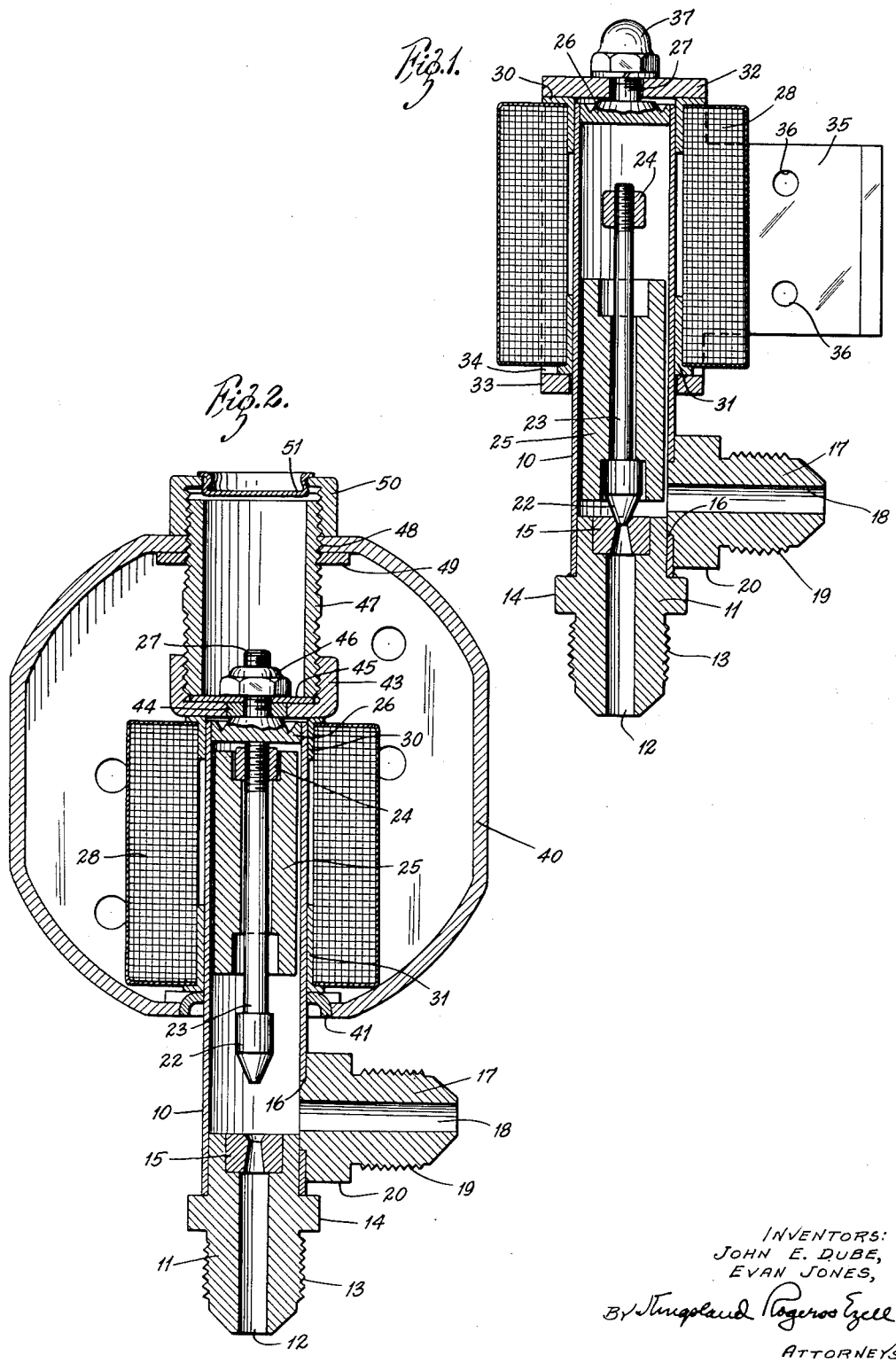

2,616,955

UNITED STATES PATENT OFFICE 2,616,955

SOLENOID

John E. Dube and Evan Jones, St. Louis County, Mo., assignors to Alco Valve Company, University City, Mo., a corporation of Missouri Application January 1, 1945, Serial No. 570,986

4 Claims. (Cl. 175—341)

The present invention relates to magnetic valves, and in particular to solenoid operated valves adapted to be attached to some other object.

Primary objects of the invention are to provide a magnetic valve of simple and inexpensive construction adapted to be readily assembled and disassembled. More particularly, it is an object of the present invention to provide a magnetic valve wherein a single tubular member constitutes both the valve body or housing and the magnetic coil liner to contain the magnetic core or armature. A further object is to provide such a valve wherein the magnetic yoke is shaped as part of a supporting bracket or box.

In the drawings:

Fig. 1 is a vertical section through one form of the invention; and

Fig. 2 is a vertical section through another form of the invention.

Referring to Fig. 1, a tubular member 10 is adapted to comprise both the valve body and the liner for the operating coil. To this end, the bottom of the tubular member 10 is closed by a load fitting 11 having a passage 12 therethrough and provided with conventional threads 13 and a wrench head 14. This fitting is inserted into the lower end of the tubular member 10 and secured thereto as by brazing, soldering, or welding. At its upper ends, it is provided with a valve seat insert 15.

The tubular member 10 has a side opening 16 therein into which a second load fitting 17 is secured as by welding or soldering, or the like. The fitting 17 has an opening 18 therein and is externally threaded at 19 and provided with a wrench head 20.

The tubular member 10 and the two fittings 11 and 17 thus provide a valve housing, an inlet and an outlet. Within the casing, a valve head 22 is adapted to close against the valve seat 15 or to be lifted therefrom. This head is integral with a valve stem 23 having a nut or collar 24 removably secured to the top thereof. Slidably mounted on the stem 23 between the valve head 22 and the collar 24 is a magnetic core 25.

The upper end of the tube 10 is closed by a cap 26 sealed into the top of the tube. This cap has a threaded projection 27 extending upwardly from the top thereof.

A magnetic coil 28 is disposed around the outer surface of the tubular member 10 and held by two flanged tubular coil sleeves 30 and 31 at its top and bottom ends, respectively, these two members being of magnetically conducting material. They, in turn, are supported between two parallel flanges 32 and 33 of a combination bracket and magnetic yoke member 34. This member has a connecting wall joining the two flanges 32 and 33, and it has a bracket-like projection 35 with holes 36, by means of which it may be attached to a support.

The upper flange 32 has an opening to receive the threaded projection 27 of the cap 26 on the main tubular member 10. The lower bracket 33 has an opening to receive the entire tubular member. A fastening cap nut 37 holds all of the removable parts together.

In operation, the fittings 11 and 17 are connected to fluid lines to be controlled by the valve, one of them being the inlet and the other the outlet. When the magnet coil 28 is deenergized, the armature 25 is released and bears upon the valve head 22 and holds it in seating position. When the coil is energized, the core 25 is lifted, and, after gaining momentum by a predetermined free movement, it strikes the collar 24 and carries the valve up until the parts strike the cap 26.

The yoke 34 performs the dual function of comprising a supporting means and also providing an external magnetic flux path between the ends of the coil.

The parts may be disassembled by removing the cap nut 37. When this cap nut 37 is removed, the tubular member may be withdrawn from the yoke member 34 through the bottom thereof. The coil sleeves 30 and 31 are then free for removal with the coil 28 from the yoke member 34. Thus the valve parts may be associated with coils of any desired type and range of voltage and frequencies, and with brackets of any suitable style.

It will be seen that this construction provides a simple, inexpensive valve wherein the single tubular member provides the valve body, wherein the valve seat is an integral part of the load fitting, and wherein the usual cast, forged or machined valve bodies, are eliminated.

In Fig. 2, a similar construction is provided. The tubular member 10, the load connections 11 and 17, the valve seat insert 15, the valve head 22, the core 25, and the cap 26 are all the same as those in Fig. 1, along with their associated parts. However, in place of the yoke 34 of Fig. 1, in Fig. 2 the junction box 40 is employed as a combination securing and magnetic means.

To support the valve construction in the junction box, a centering washer 41 is provided in an opening at the bottom of the box 40, this washer being provided with downturned lugs engaging in the opening and being held in place by the planar remaining radial projections which rest upon the bottom of the junction box. The lower flanged collar or sleeve 31 rests upon the washer 41. The upper flanged collar 30 receives a lower bushing 43 fitted over the projection 27 of the cap 26. A spacer washer 44 fits within the center opening of the bushing 43 and receives the center part of a sealing washer 45, also disposed over the projection 27. A nut 46 is threaded onto the projection 27 to hold the parts thus far described together.

A conduit nipple 47 is externally threaded to engage within the internal threads of the bushing 43. It is threaded into the bushing and bears against the sealing washer 45 to establish a tight seal. The nipple 47 passes through an upper opening 48 in the junction box wall, there being a lock nut 49 within the wall to draw the parts tightly together by forcing the valve elements as a whole downward. An upper bushing 50 fits over the projecting part of the nipple 47 and is threaded thereon to give a final holding of the parts. A snap insert 51 is removably disposed in an opening in the top of the bushing 50.

This type construction of Fig. 2 has the advantage that the electrical parts are wholly enclosed within a junction box 40, which, when covered in conventional manner, provides the greatest of security against the effects of sparking and the like. The power lines are brought into the junction box, where the connections are made with the coil leads. The magnetic operation is the same as that of Fig. 1, save that flux is passed from one end to the other of the coil, externally of the coil, through the junction box walls and the associated parts, including the nipple 47.

The parts may be disassembled by removing the cap 51, withdrawing the nut 46, and sliding the tube 10 and valve parts out of the box and the coil parts. The nipple 47 may be removed by removing the bushing 50. Assembly is effected by installing the nipple 47, the centering washer 41, and the coil 28 with the sleeves 30 and 31, into the box 40, after which the valve tube 10 may be inserted, and the nut 46 replaced.

What is claimed is:

1. In a magnetic valve housing assembly for use with a valve, a magnetic coil having an opening therethrough, a tubular member disposed in said opening and projecting therefrom, a magnetic armature comprising a magnetic tubular casing with opposed recessed seats at the ends and a non-magnetic rod slidably fitted in said casing with stops at its opposite ends adapted to seat in said recesses and spaced from one another a distance greater than the distance between said recessed seats within the tubular member adapted to be influenced by the magnetic coil when the magnetic coil is energized, and means to secure the tubular member and the coil member together, said last-named means including a magnetic frame having a projection extending below the coil and receiving the tubular member and having a projection extending above the coil, a flanged sleeve around the tubular member with its flange between the bottom thereof and the bottom extension on the yoke, a second flanged sleeve surrounding the upper part of the tubular member with its flange between the top of the coil and the upper projection on the frame, and an interengaging removable attaching means between the tubular member and the upper projection on the frame.

2. In a magnetic valve housing assembly for use with a valve, a magnetic coil having an opening therethrough, a tubular member disposed in said opening and projecting therefrom, a magnetic armature comprising a magnetic tubular casing with opposed recessed seats at the ends and a non-magnetic rod slidably fitted in said casing with stops at its opposite ends adapted to seat in said recesses and spaced from one another a distance greater than the distance between said recessed seats within the tubular member adapted to be influenced by the magnetic coil when the magnetic coil is energized, and means to secure the tubular member and the coil member together, said last-named means including a magnetic yoke having an arm extending below the coil and receiving the tubular member and having another arm extending above the coil, a flanged sleeve around the tubular member with its flange between the bottom thereof and the bottom arm on the yoke, a second flanged sleeve surrounding the upper part of the tubular member with its flange between the top of the coil and the upper arm on the yoke, and an interengaging removable attaching means between the tubular member and the upper arm on the yoke, said interengaging means including a sealing cap enclosing the top of the tubular member, a threaded member fastened to the sealing cap adapted to pass through the upper arm on the yoke, and a cap nut over the upper arm of the yoke threadedly engageable with the threaded member.

3. In a magnetic valve housing assembly for use with a valve, a magnetic coil having an opening therethrough, a tubular member of uniform cross section disposed in said coil and projecting downwardly therefrom, a magnetic armature comprising a magnetic tubular casing with opposed recessed seats at the ends and a non-magnetic rod slidably fitted in said casing with stops at its opposite ends adapted to seat in said recesses and spaced from one another a distance greater than the distance between said recessed seats disposed within the tubular member, a magnetic securing member having closed and opposed walls, one of said walls passing under the bottom of the magnetic coil, the other passing over the top thereof, and means for removably attaching the tubular member to one of said walls, the tubular member supporting the coil laterally against withdrawal from the securing member, and the opposed walls of the securing member supporting the coil against endwise displacement by means of magnetic flanged sleeves inserted between the tubular member and the magnetic coil, one of said sleeve flanges being disposed in a locking engagement between the bottom of the coil and the bottom wall of said securing member, the flange of said other sleeve being disposed in locking engagement between the top of the coil and removable attaching means in the top of said securing member.

4. In a magnetic valve housing assembly for use with a valve, a magnetic coil having an opening therethrough, a tubular member disposed in said coil and projecting downwardly therefrom, a magnetic armature comprising a magnetic tubular casing with opposed recessed seats at the ends and a non-magnetic rod slidably fitted in said casing with stops at its opposite ends adapted to seat in said recesses and spaced from one another a distance greater than the distance between said recessed seats disposed within the tubular member, a magnetic securing member having closed and opposed walls, one of said walls passing under the bottom of the magnetic coil, the other passing over the top thereof, and means for removably fastening the upper end of the tubular member to the upper wall so as to suspend it in adjustable relation therefrom, comprising a magnetic flanged sleeve adapted to be inserted between said tubular element and the top of the coil, an internally threaded cap locking the flange of said sleeve against the top of the coil, an externally threaded tubular element adapted to threadably engage said cap and hold it in spaced relation from the upper wall of said securing member, said upper wall having an internally threaded attachment so that the threaded tubular element can be axially adjusted so as to vary the position of said tubular member relative to the upper and lower walls of the securing member.

JOHN E. DUBE.
EVAN JONES.

REFERENCES CITED

The following references are of record in the file of this patent:

UNITED STATES PATENTS

| Number | Name | Date |
|---|---|---|
| Re. 21,370 | Alexander | Feb. 20, 1940 |
| 765,550 | Brown | July 19, 1904 |
| 955,676 | Oehmen | Apr. 19, 1910 |
| 1,051,350 | Nogier | Jan. 21, 1913 |
| 1,124,599 | Fessenden | Jan. 12, 1915 |
| 1,199,699 | Henderson | Sept. 26, 1916 |
| 1,270,170 | Kingsbury | June 18, 1918 |
| 1,382,412 | Campbell | June 21, 1921 |
| 1,383,432 | Simon | July 5, 1921 |
| 1,465,723 | West | Aug. 21, 1923 |
| 1,607,392 | Denison | Nov. 16, 1926 |
| 1,651,865 | Blake | Dec. 6, 1927 |
| 1,701,191 | Ray | Feb. 5, 1929 |
| 1,884,884 | Seaton | Oct. 25, 1932 |
| 2,096,763 | Ray | Oct. 26, 1937 |
| 2,098,196 | Ray | Nov. 2, 1937 |
| 2,098,197 | Ray | Nov. 2, 1937 |
| 2,121,657 | Fisher | June 21, 1938 |
| 2,181,423 | Gille | Nov. 28, 1939 |
| 2,223,986 | Eaton | Dec. 3, 1940 |
| 2,283,903 | Ashcraft | May 26, 1942 |
| 2,291,599 | Ray | Aug. 4, 1942 |
| 2,388,990 | Nelson | Nov. 13, 1945 |

FOREIGN PATENTS

| Number | Country | Date |
|---|---|---|
| 17,926 | Great Britain | of 1913 |
| 135,921 | Austria | Aug. 15, 1933 |
| 346,548 | Italy | Feb. 20, 1937 |
| 677,819 | Germany | July 3, 1939 |
| 857,532 | France | Sept. 17, 1940 |